E. W. REED.
PROCESS OF MAKING CALCIUM ACID PHOSPHATE.
APPLICATION FILED JULY 19, 1913.
1,105,304.
Patented July 28, 1914.
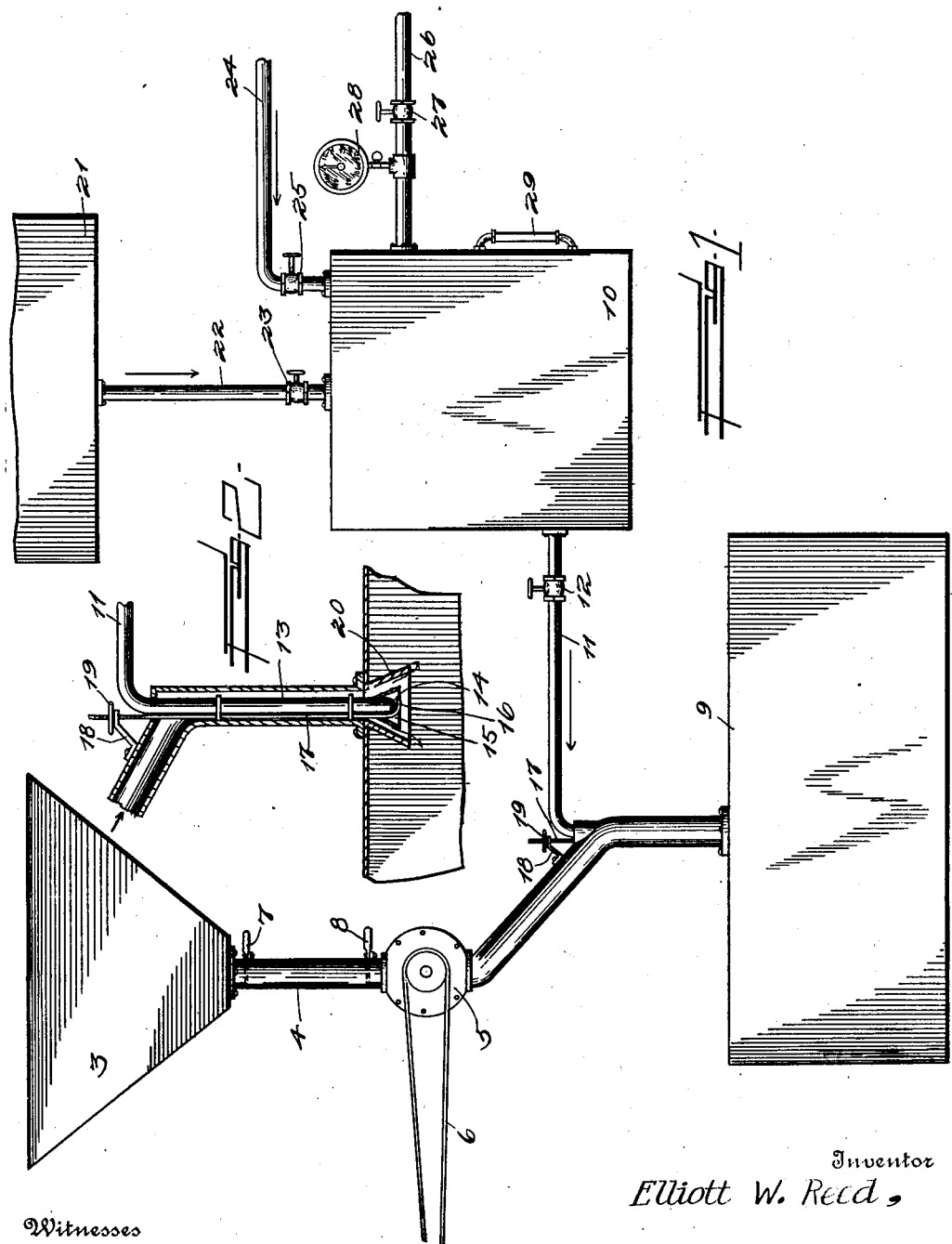
Witnesses
Inventor
Elliott W. Reed,
By
Attorney

UNITED STATES PATENT OFFICE.

ELLIOTT W. REED, OF SAVANNAH, GEORGIA.

PROCESS OF MAKING CALCIUM ACID PHOSPHATE.

1,105,304.  Specification of Letters Patent.  Patented July 28, 1914.

Application filed July 19, 1913. Serial No. 779,902.

*To all whom it may concern:*

Be it known that I, ELLIOTT W. REED, a citizen of the United States, residing at Savannah, in the county of Chatham and State of Georgia, have invented certain new and useful Improvements in Processes of Making Calcium Acid Phosphate, of which the following is a specification.

My invention relates to a novel process of and apparatus for producing calcium acid phosphate.

An important object of my invention is to provide a novel process for making calcium acid phosphate, by bringing powdered or finely divided phosphate material, such as powdered bone or phosphate rock into contact with sulfuric acid, by the employment of a current of air as the agitating means, whereby the process is carried out in an expeditious, continuous and economical manner.

A further object of my invention is to provide apparatus of the above mentioned character, which is simple in construction, easy to operate and cheap to manufacture.

Other objects and advantages of this invention will be apparent during the course of the following description.

My invention consists generally in the provision of means for forcing powdered phosphate material, such as, phosphate rock or bone, through or into a receptacle by a current of air, and spraying sulfuric acid into the powdered phosphate material laden air, whereby the acid will act upon the same in a highly efficient manner, to produce calcium acid phosphate, which is collected in a suitable receptacle. The acid is also supplied under pressure, whereby the same may be properly sprayed into the powdered phosphate material laden air. By this means the powdered phosphate material and acid are continuously agitated in the presence of each other and thoroughly mixed. Means are also provided whereby the relative volumes of acid and phosphate material may be properly regulated.

In the accompanying drawings forming a part of this specification and in which like numerals are employed to designate like parts throughout the same, Figure 1 is a side elevation of the complete apparatus, and, Fig. 2 is a detailed section through the spray apparatus.

In the drawings, wherein for the sake of illustration, is shown a preferred example of the apparatus preferably employed in the practice of my process, the numeral 3 designates a hopper or receptacle for holding the powdered phosphate material, such as phosphate rock or bone. Leading into the lower end of this hopper is a pipe 4, having a rotatable fan 5, connected in series therewith, serving to draw the powdered phosphate rock or bone from the hopper. The shell of the fan 5 is suitably perforated, to allow of the entrance of air into the same, forming a downwardly flowing current of air, which is laden with the powdered phosphate rock or bone dust. The fan 5 may be driven by a belt 6 or other suitable means. Above the fan 5 the pipe 4 is provided with a cut off valve 7 and a regulating valve 8 of any well known or preferred type. The lower portion of the pipe 4 leads into a calcium acid phosphate den or chamber 9, as shown.

The numeral 10 designates an acid pressure supply tank, for receiving the sulfuric acid. Connected with the tank 10 is a pipe 11 provided with an adjustable valve 12 for controlling the amount of acid passing through the pipe 11. As more clearly shown in Fig. 2, the free end of the pipe 11 is bent downwardly for forming a depending portion 13, which extends through the lower vertical portion of the pipe 4, in spaced concentric relation thereto, as shown. At its lower end the depending portion 13 of the pipe 11 is provided with a suitably large discharge opening 14, surrounded by a conical deflector or hood 15, increasing in diameter downwardly, as shown. This hood is attached to the lower end of the depending portion 13 by any suitable means. Mounted within the deflector 15, below and adjacent the opening 14, is a horizontal plate or valve 16, adapted for movement toward and away from the opening 14, to control the passage of the acid therethrough and also serving to deflect or spray the same laterally and horizontally. The plate or valve 16 is rigidly connected with a depending rod 17 which is vertically adjustable and passes through an aperture in a fixed bracket 18, the same having a screw-threaded portion for receiving a hand wheel 19, by the turning of which the rod 17 may be raised or lowered. Attention is called to the fact that the deflector 15 and associated elements are mounted within the den 9. Connected with the lower end of the pipe 4 is an outer conical deflector or hood 20, increasing in diameter downwardly and surrounding the inner hood 15, in spaced concentric relation. The air laden with the powdered phosphate rock or bone is discharged through the deflector 20 and when passing from the lower end thereof comes in contact with the spray of sulfuric acid passing from the lower end of the inner deflector 15. It is obvious that as a result of this calcium acid phosphate will be formed and collected within the den 9.

The numeral 21 designates an acid holding tank, having connection with a pipe 22, which leads into the upper end of the tank 10 and is provided with a cut off valve 23. Leading into the outer end of the tank 10 is an air outlet pipe 24, provided with a cut off valve 25. Leading into one side of the tank 10 near the upper end thereof is an air pressure supply pipe 26, provided with a cut off valve 27 and a pressure gage 28.

The numeral 29 designates a glass tube gage, indicating the level of acid within the tank 10.

In carrying out my process, the valves 12 and 27 being closed, valves 23 and 25 are opened, whereby the acid will be fed from the tank 21 into the tank 10, the air escaping through the pipe 24. Valves 23 and 25 are now closed. The fan 5 is now set in operation, whereby the same creates a current of air in the pipe 4, passing downwardly through the same into the den 9. The valves 7 and 8 are suitably opened, to supply the desired amount of the powdered phosphate rock or bone, whereby the air passing downwardly in the pipe 4 becomes laden with the same. The valve 27 is opened to allow the passage of the compressed air into the tank 10, there being preferably maintained a pressure of from 60 to 100 pounds within the tank 10, which will be indicated by the gage 28. The sulfuric acid employed is preferably of 52° Baumé, at 120° to 160° Fhr. Upon opening the valve 12 the acid under pressure will be supplied to the pipe 11 and discharged in a small stream or jet through the opening 14, the same impinging against the plate or valve 16, whereby it is sprayed horizontally and laterally against the inner deflector 15, such sprayed acid passing from the same into the deflector 20, to become intimately mixed with the powdered phosphate rock or bone laden air.

The acid of course acts upon the powdered phosphate rock or bone, forming calcium acid phosphate, which is collected within the den 9.

While I have shown and described the preferred embodiment of my process and apparatus, yet it is to be understood that various changes may be made therein without departing from the spirit of the invention or the scope of the subjoined claims.

Having described my invention, I claim:—

1. The herein described process of producing calcium acid phosphate, which consists in thoroughly agitating finely divided phosphate material by means of a current of air, and simultaneously subjecting the same to the action of an acid.

2. The herein described process of producing calcium acid phosphate, which consists in thoroughly agitating powdered phosphate material by means of a current of air, and spraying an acid upon the powdered phosphate material while the same is being subjected to such agitation.

3. The herein described process of producing calcium acid phosphate, which consists in spraying an acid into a moving body of air which is laden with finely divided phosphate material.

4. The herein described process of producing calcium acid phosphate, which consists in rapidly passing air laden with powdered phosphate material through a conduit, spraying sulfuric acid into the phosphate material laden air while the same is in motion, and collecting the calcium acid phosphate formed as a result of the same.

5. The herein described process of producing calcium acid phosphate, which consists in passing air laden with powdered phosphate material through a conduit, passing sulfuric acid through a conduit extending through the first named conduit and spraying the acid into the phosphate material laden air near the outlet end of the conduit through which the phosphate material laden air passes, and collecting the calcium acid phosphate formed as a result of the same.

In testimony whereof I affix my signature in presence of two witnesses.

ELLIOTT W. REED.

Witnesses:
  Geo. S. Haines,
  Garrard Haines.